United States Patent [19]

Verdier

[11] Patent Number: 5,211,908
[45] Date of Patent: May 18, 1993

[54] METHOD OF MANUFACTURING A GRID HAVING CALIBRATED CELLS FOR A NUCLEAR FUEL ASSEMBLY

[75] Inventor: Michel Verdier, Villeurbanne, France

[73] Assignees: Framatome, Courbevoie; Compagnie Generale des Matieres Nucleaires, Velizy Villacoublay, both of France

[21] Appl. No.: 735,256

[22] Filed: Jul. 24, 1991

[30] Foreign Application Priority Data

Jul. 24, 1990 [FR] France .................. 90 09448

[51] Int. Cl.$^5$ .................................................. G21C 3/34
[52] U.S. Cl. ..................... 376/442; 376/438; 376/462; 376/439
[58] Field of Search ............... 376/442, 438, 462, 439, 376/443; 976/DIG. 72, DIG. 79, DIG. 80, DIG. 83

[56] References Cited

U.S. PATENT DOCUMENTS

| | | | |
|---|---|---|---|
| 3,940,314 | 2/1976 | Knodler et al. | 376/442 |
| 4,125,435 | 11/1978 | Jabsen | 376/442 |
| 4,427,622 | 1/1984 | Knecht et al. | 376/260 |
| 4,539,738 | 9/1985 | Antol et al. | 29/467 |
| 4,663,119 | 5/1987 | Kerry | 376/446 |
| 4,924,586 | 5/1990 | King, Jr. et al. | 29/723 |
| 4,933,138 | 6/1990 | Mouesca et al. | 376/442 |
| 4,946,587 | 8/1990 | Reeves et al. | 209/539 |

FOREIGN PATENT DOCUMENTS 0222623  3/1990  European Pat. Off.

Primary Examiner—Donald P. Walsh
Assistant Examiner—Meena Chelliah
Attorney, Agent, or Firm—Pollock, Vande Sande and Priddy

[57] ABSTRACT

There is provided a method of manufacturing a grid for a nuclear fuel assembly, the grid having at least two crossed sets of mutually parallel plates which define cells, some of which receive guide tubes and others receive fuel rods, the plates being provided with boss means for limiting the amount of movement available to the rods relative to the nodes of a regular array. The plates are formed with bosses projecting radially inwardly into each cell for receiving a fuel rod by such an amount that they define a passage having a size at least equal to a minimum diameter of the fuel rods. Then the bosses are deformed radially outwardly for imparting to each passage a predetermined radial size, slightly higher than that of one fuel rod and determined by a gauge.

10 Claims, 3 Drawing Sheets

METHOD OF MANUFACTURING A GRID HAVING CALIBRATED CELLS FOR A NUCLEAR FUEL ASSEMBLY

FIELD OF THE INVENTION

The present invention relates to a method of manufacturing a grid for a nuclear fuel assembly, the grid having at least two crossed sats of mutually parallel plates which define cells, of which some receive guide tubes and others receive fuel rods, the plates being provided with boss means for limiting the amount of movement available to the rod relative to the nodes of a regular array.

One of the functions of such grids is to hold the fuel rods transversely to prevent the coolant from exciting vibrations of an amplitude which would cause wear of the sheaths of the rods by mechanical interaction with the plates.

BACKGROUND OF THE INVENTION

In most prior art fuel assemblies, the plates are provided with springs situated opposite bosses and exerting a force on the rods to hold them against the bosses. However, changes in reactor design particularly towards higher burn-up and higher thermohydraulic performance, have led to changes in the functions of the various grids. In particular, it is presently considered advantageous to use a single grid to support the fuel rods, with the other grids belonging to two possible different types. One of these types has a structural role and includes a belt, while the other type has a role that is purely thermohydraulic.

Proposals have already been made to provide grids (other than the grids which support the fuel rods) with bosses placed at one or more levels in the coolant flow direction, without any springs. To avoid damage to the rod sheaths during insertion, the gaps between the bosses leave clearance for the rods. However, manufacturing tolerances are such that leaving residual clearance for the largest diameter rods imply that the clearance left for the smallest diameter rods and the largest cells can reach a high value of about 0.4 mm. This clearance may increase further while the assembly is under irradiation due to creeping of the rod sheath or expansion of the cell, and this can lead to sufficient clearance to enable vibrations to reach amplitudes that will damage sheaths.

SUMMARY OF THE INVENTION

An object of the present invention is to provide a method of manufacturing a grid enabling dimensional variations between cells to be reduced and thus reducing the size of the maximum clearance that may exist at the beginning of the lifetime of a grid, and after it has been irradiated.

To this end, the present invention provides a method of manufacturing a grid of the above-defined type, in which said means are constituted by bosses that initially project so as to define a passage no greater than the minimum diameter of fuel rods, the bosses being outwardly deformed on a permanent basis prior to inserting the rods to impart a predetermined size to each passage, which predetermined size is slightly greater than the size of a rod and is fixed by a template.

The template may be designed so that the maximum clearance at the beginning of assembly utilization does not exceed 0.2 mm, such that after irradiation, the maximum value that can be reached by the clearance does not run the risk of causing the rod sheaths to be damaged rapidly.

A very wide variety of processes may be used for performing the deformation.

A first solution consists in shaping the bosses by deforming them plastically by means of a template-constituting gauge which may be rigid and exerted by force, or which may be expandable to a determined diameter.

A second solution consists in deforming the bosses by thermal creep under mechanical stress caused by prior insertion of a template-constituting gauge.

Because mechanical stresses are imposed on the entire grid by inserting a gauge, even if only some of the cells are processed simultaneously, it is desirable to begin by placing the grid in a rigid frame so that expansion of the bosses does not give rise to overall distortion of the grid.

A third solution, which is applicable when the bosses are solid in nature, consists in machining the bosses of the grid by mechanically removing shavings, i.e., by conventional broaching, milling, or boring or by an electrochemical or an electro-erosion, in which case the machining tool constitutes the template.

When the machining tool is designed to impart a circular section to the bearing faces of the bosses, the machining solution presents the advantage of providing a larger contact area to the fuel rods placed in the cell, thereby minimizing wear of the sheath. By contrast, it is more complex.

The invention is equally applicable to grids delimiting cells distributed in a triangular area and to grids for holding rods at the nodes of a square array, with triangular array grids generally having three sets of plates and square array grids having only two. The following description refers solely to grids for holding rods at the nodes of a square array, but the method described is directly transposable to a triangular array grid.

BRIEF DESCRIPTION OF THE DRAWINGS

The embodiments of the invention are described by way of example with reference to the accompanying drawings, in which.

DETAILED DESCRIPTION OF PREFERRED EMBODIMENTS

Figure 1:
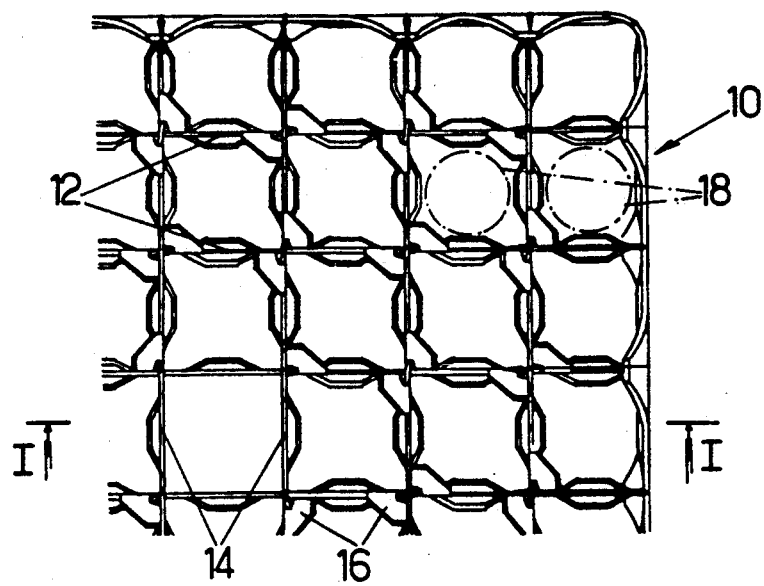
FIG. 1 is a plan view of a fraction of a grid having bosses to which the invention is applicable.
Figure 2:
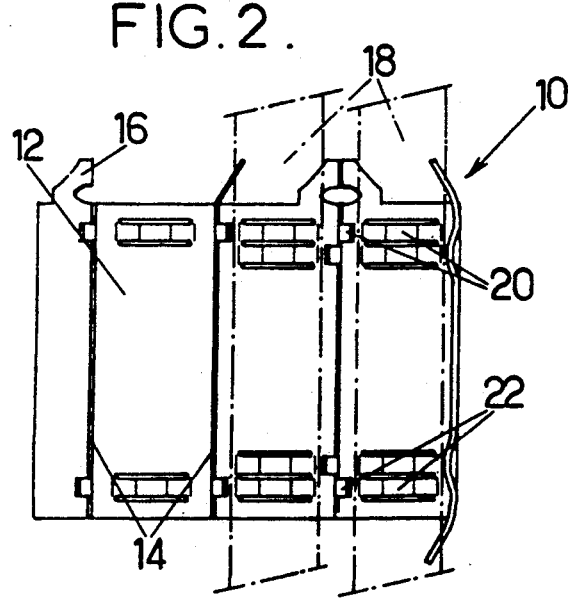
FIGS. 2 and 3 are section views on line I—I of FIG. 1, showing grids in which each cell containing a fuel rod has two planes of bosses and one plane of bosses, respectively.

The grid shown in FIGS. 1 and 2 is particularly suitable for use as a structural grid in a nuclear fuel assembly for a pressurized water reactor, however in a lighter form optionally having the belt omitted, it is also usable as a grid having a purely thermohydraulic function. Such a grid may be incorporated, in particular, in a fuel assembly of the kind described in either of U.S. patent applications Ser. Nos. 07/735,251 and 07/735,246 assigned to the same assignee and filed on the same day as the present application the contents of which are included the present specification reference.

The grid 10 is constituted by two mutually crossed sets of parallel plates 12 and 14, made of a zirconium-based alloy such as "Zircaloy 4" that has been thermally relaxed. The plates are generally cut out from a foil, assembled to half-depth, and fixed together by welding at their cross-points. Their downstream edges are extended by mixing fins 16 that may take up any of the conventional dispositions already in use. The plates may also be provided with tongues (not shown) placed around the cells for receiving guide tubes. Such tongues are designed to be welded to the guide tubes, e.g., by resistance welding.

Each face of each of the cells that is designed to receive a fuel rod 18 (only two of which are shown schematically in FIGS. 1 and 2) is provided with at least one inwardly-projecting boss, with the exception of the outermost cells which include bosses on only two or three of their faces.

When the grid is in its final condition, the abutment bosses project by such an amount that there is a diametral clearance that allows the fuel rods 18 to slide but that is small enough to ensure that the amplitude of any vibration that may be induced by the flow of coolant does not reach a value such that the sheaths are damaged by shocks. The fins 16 must themselves be designed to ensure that the bosses 20 prevent the rods from coming into contact with the fins.

In the embodiment shown in FIG. 2, each cell for receiving a fuel rod (except for the outermost cells) is provided with eight bosses 20, 22 distributed over two different levels, each boss being situated close to one of the major faces of the grid.

Figure 3:
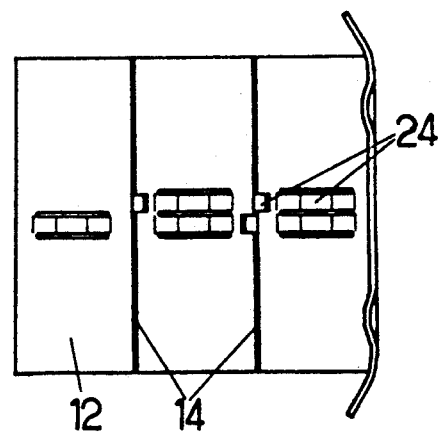

By contrast, in the embodiment of FIG. 3, each cell is provided with only four bosses 24, placed close to the mid-plane of the grid.

In either case, the bosses are constituted by cutting out a strip from the plates and by pressing back each strip in one direction or the other. The invention is nevertheless applicable to bosses of a different structure, as they are capable of being formed by plastic deformation.

To calibrate all cells, i.e., to impart a determined value to the gap between facing pairs of bosses, a first technique consists in deforming the bosses plastically, by purely mechanical means using a gauge constituting a template.

Figure 4:
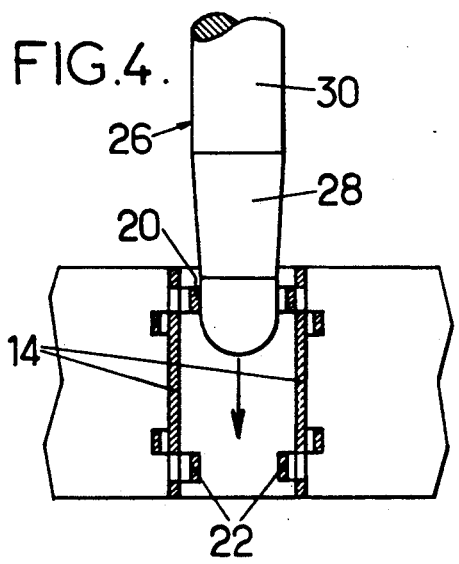
FIGS. 4 and 5 are diagrams showing two successive stages of the insertion of a gauge into a cell for calibrating the cell by plastic deformation.
Figure 5:
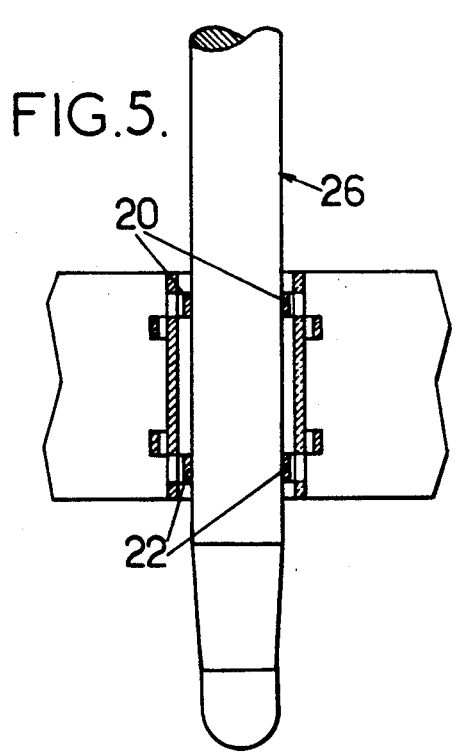

In the embodiment of FIGS. 4 and 5, the gauge 26 comprises a cylindrical calibration body 30 having a tapering nose with a rounded end to facilitate insertion of the gauge. All of the cells may be calibrated simultaneously by inserting a bundle of gauges therein.

This technique has the advantage of simplicity. It has the drawback that a large tangential force is applied to the bosses of the grid which may have an unfavorable effect on the surface condition of the bosses and on the parallelism between the bearing surfaces thereof and a fuel rod placed in a cell. This drawback is easily overcome for a grid of the kind shown in FIG. 3. It makes implementation more complicated with a grid of the type shown in FIG. 2 having bosses 20 and 22 at two different levels.

Figure 6:
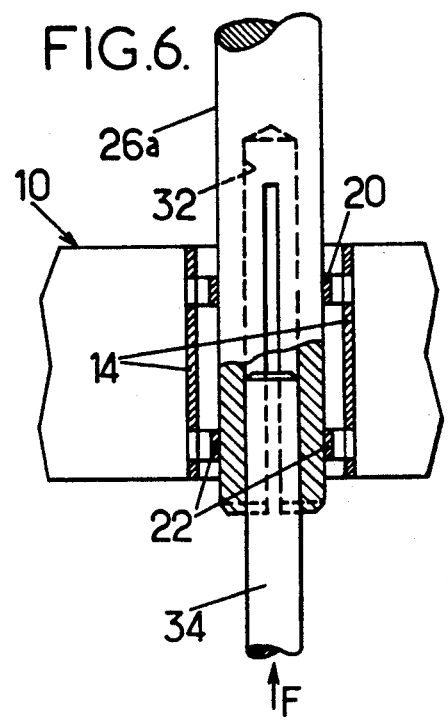
FIG. 6 is similar to FIG. 5 and shows plastic deformation obtained by expanding a split gauge.
Figure 8A:
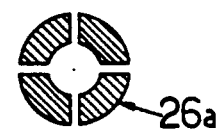
FIGS. 8A and 8B are cross-sections through expandable split gauges respectively designed for use with a square array cell and with a triangular array cell.
Figure 8B:
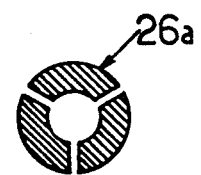

The drawback is overcome with a gauge 26a as shown in FIG. 6. The end portion of gauge 26a is split by two radial slots and its outside shape is cylindrical. Resilient fingers are thus formed. There are four fingers when the gauge 26a is for use in a square array grid (FIG. 8A); and there are three fingers when the gauge is for use in a triangular array grid (FIG. 8B). A blind central bore 32 is formed in the gauge to receive a calibrated stem 34. The diameter of the stem 34 and the diameter of the bore 32 are selected so that when the gauge is expanded by inserting the stem 34, the cross-section of the bottom portion of the gauge is as required for adjusting the extent to which the bosses project to an appropriate value.

The above description makes it clear how the embodiment of FIG. 6 is implemented. The gauges 26a are inserted into the grid cells to be calibrated. Insertion takes place easily since each gauge can contract by reducing the width of its slots, should it be engaged in a cell that is narrow. The stems 34 are then inserted into the bores 32 (arrow F in FIG. 6), thereby bringing the outside diameters of the gauges to the calibration value while deforming the bosses or walls of the cells.

The residual resiliency of the material constituting the plates generally makes it necessary to oversize the gauges and the stems so that, when the gauges 26a are removed, the cells take up the required dimensions.

When the cells to be calibrated include bosses situated at two levels, as shown in FIG. 6, then the slots and the bores 32 must be long enough to enable the cross-section of the gauges to be circular at both levels when the stems are fully inserted.

It is possible to calibrate the cells of a single grid in several steps. However, to ensure that the cell distribution array remains uniform over the entire grid 10, it is preferable to calibrate all of its cells simultaneously by using as many gauges 26 or 26a as there are cells to be calibrated. Cylindrical wedges may be placed in those cells that are to receive guide tubes so as to prevent these cells frrm being deformed when the gauges are inserted.

Figure 7:
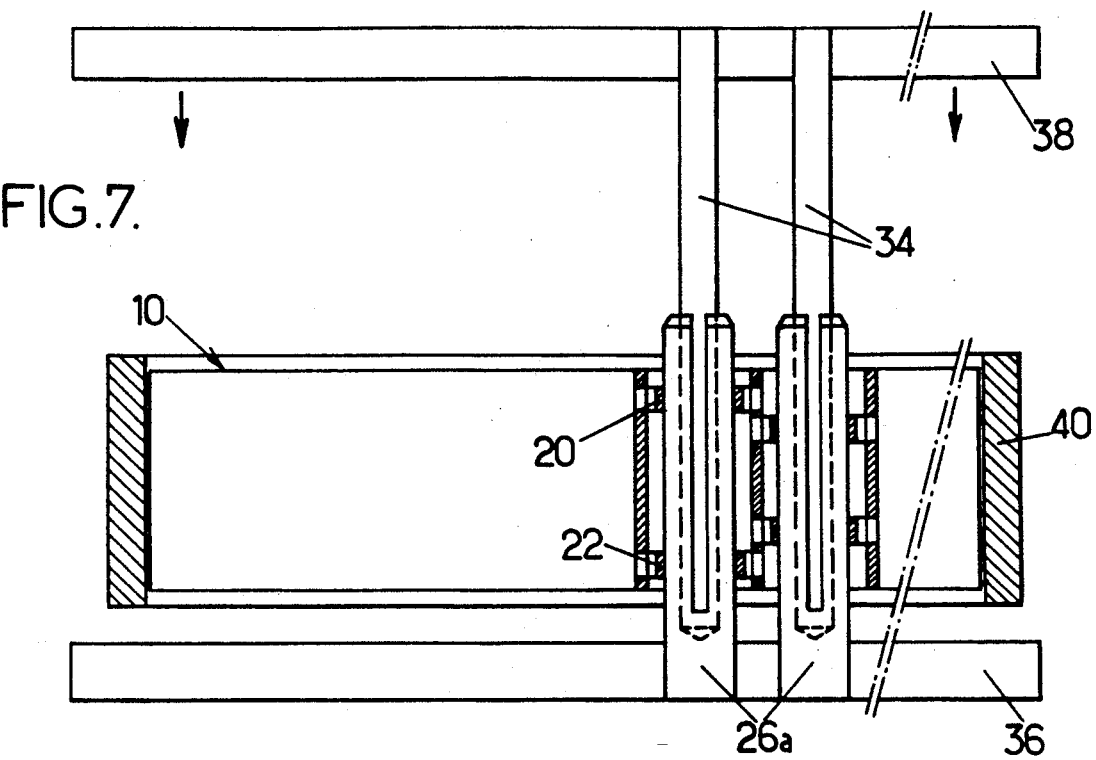
FIG. 7 shows an installation for calibrating all of the cells of a grid simultaneously using expandable split gauges of the kind shown in FIG. 6.

As shown in FIG. 7, calibration may be performed on a mechanical, hydraulical, or screw press with its fixed plate 36 carrying the gauges 26a, for example, while its moving plate 38 carries the stems 34.

To prevent transverse expansion of the grid during permanent deformation of the bosses, it is advantageous to place the grid 10 in a frame 40 having a central opening of a size equal to the maximum dimensions that can be tolerated for the envelope of the grid. The resilient return of the grid plates when the gauges 26 or 26a are extracted then causes the size of the envelope to reduce slightly and makes it possible to remove the frame.

A second technique consists in making use of the ability of the materials that are normally used for making grids that do not have a support function, to creep under the effects of mechanical stress associated with a temperature that is high enough.

Figure 9:
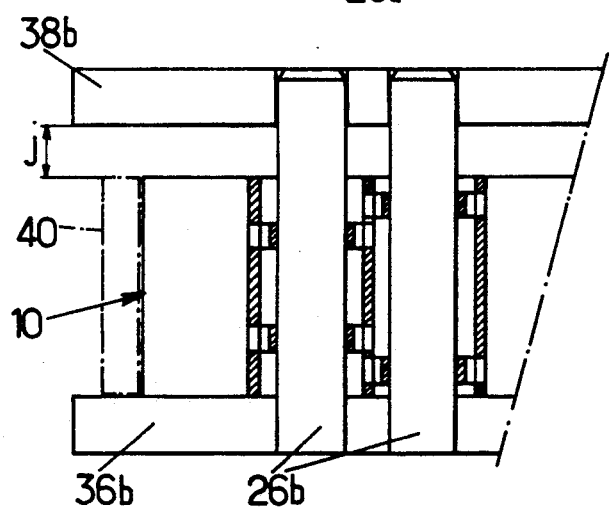
FIG. 9 is similar to FIG. 7 and shows an installation suitable for calibrating the cells of a grid by thermal creep under stress.

As shown in FIG. 9, this is done by inserting cylindrical gauges 26b, carried by a plate 36b, into the cells and then centering their terminal portions by means of a second plate 38b. The diameter of the gauges is determined as a function of the dimensions to be given to the grid cells after calibration. This diameter depends on the nature of the grid material and on the heat treatment temperature which together determine shrinkage on removal of the gauges. As in FIGS. 4 to 7, the grid plates are initially formed so that the distance between confronting bosses after the plates have been assembled into a grid is less than the dimension to be achieved. A clearance j is provided to absorb thermal expansions.

As in the preceding case, it is advantageous to calibrate all cells simultaneously, and, to avoid overall unwanted deformation due to thermal cycling, it is advantageous for the grid to be held inside a frame 40 during creep.

Creep conditions naturally depend on the nature of the material from which the grid is made. In particular, the temperature to which the grid should be heated, the length of time the temperature should be maintained, and the atmosphere under which the treatment is performed, are all selected so as to ensure that thermal creep takes place without detrimentally affecting the metallurgical structure of the material. When the grid is made of a zirconium alloy such as "Zircaloy 4", satisfactory results may be obtained by maintaining the grid at a temperature in the range 400° C. to 475° C. for a period of time in the range 1 hour to 2 hours and 30 minutes, under a protective atmosphere. Under these conditions, there is generally no need to subject the grids to further heat treatments after creep.

Figure 10:
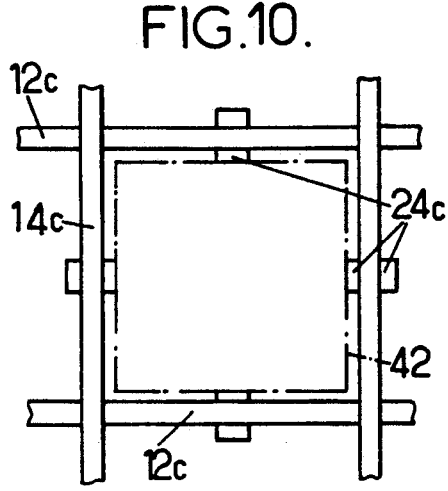
FIGS. 10 and 11 are schematic plan views showing a cell having solid bosses that are calibrated by machining to take up a square envelope (FIG. 10) or a circular envelope (FIG. 11).

Finally, a third technique which is suitable for use with bosses that are solid, consists in machining the grid so that the distance between facing bosses leaves a clearance allowing insertion of the fuel rods. This technique is particularly suitable when the grid is machined from a solid metal slab. The grid may be made by pressure molding, followed by machining of the surfaces of the bosses. FIG. 10 is a diagram by way of example of a cell in a grid made up of crossed plates 12c and 14c that are welded together at their intersections, and are provided with bosses 24c in the form of solid studs. Since very small quantities of material need be removed (about 0.1 mm over a width of 2 to 3 mm in a representative case), all four bosses in a given cell can be machined simultaneously by removing shavings by broaching or by electro-erosion using a tool 42 having the shape to be obtained. It is also possible to use mechanical machining by milling or by boring, or to use an electro-erosion with a wire.

Figure 11:
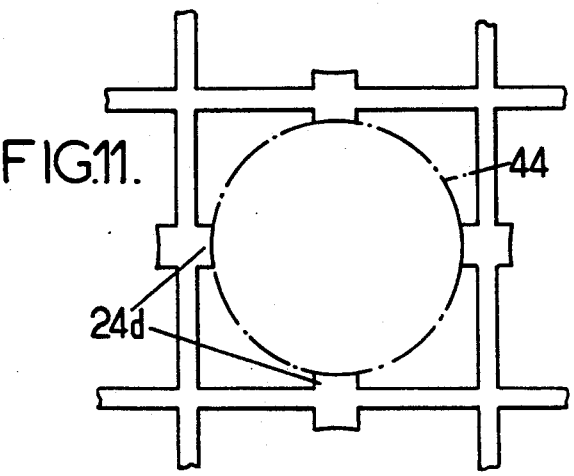

Referring to FIG. 11, the grid comprises a single piece and the bosses 24d are integral therewith. Machining may be performed by any of the methods mentioned above. It is also possible to use a tool 44 whose envelope has the shape to be obtained, which has the advantage of providing bearing surfaces that closely follow the shape of the sheath of a fuel rod, thereby providing a greater contact area between the fuel rods and the bosses and thus reducing wear and tear.

Referring to the particular embodiments shown and described by way of example, and in particular the invention is applicable to a very wide variety of boss shapes, including bosses that differ from the bridge-shaped bosses of the kind shown in FIGS. 1 to 9 and from the solid bosses shown in FIGS. 10 and 11.

I claim:

1. Process for assembling a grid and a bundle of cylindrical fuel rods of a nuclear fuel assembly, said grid having at least two crossed sets of mutually parallel plates which define cells, some of said cells receiving guide tubes and other of said cells receiving said fuel rods, the plates being provided with boss means for limiting the amount of movement available to the fuel rods relative to the nodes of a regular array and said fuel rods having a diameter which may vary, from one fuel rod to another, from a predetermined minimum value to a predetermine maximum value, said process comprising the steps of:
    (a) forming boss means projecting radially inwardly into each of said cells for receiving fuel rods by such an amount that they define passages having sizes no greater than said predetermined minimum diameter;
    (b) shaping said boss means by deforming them radially outwardly for imparting to each passage a predetermined radial size slightly higher than said predetermined maximum diameter and determined by a gauge; and
    (c) inserting sad fuel rods into the respective cells.

2. Method of manufacturing a grid for a nuclear fuel assembly, the grid having at least two crossed sets of mutually parallel plates of zirconium-base alloy, fixed together by welding at the crossings thereof, which define cells some of said cells receiving guide tubes and others of said cells receiving cylindrical fuel rods having a diameter which may vary, from one fuel rod to another, from a predetermined minimum value to a predetermined maximum value, due to manufacturing tolerances, the plates being provided with boss means for limiting the amount of movement available to the rods relative to the nodes of a regular array, said process comprising the steps of:
    (a) forming boss means projecting radially inwardly into each one of said cells which are to receive fuel rods, by such an amount that said boss means define passages having sizes no greater than said predetermined minimum diameter, said boss means being formed as cut-out strips; and
    (b) shaping said boss means by deforming them radially outwardly, for imparting to each passage a predetermined radial size slightly higher than said predetermined diameter, by forcing rigid cylindrical gauges all having the same size through said cells which are to receive fuel rods, in a direction parallel to all said plates, for determining said boss means plastically.

3. Process according to claim 2, wherein said boss means are shaped by inserting rigid cylindrical gauges through said cells for receiving guide tubes and causing permanent deformation of said boss means by heating said grid to such a temperature and for such a time as to cause thermal creep f said plates.

4. Process according to claim 2, wherein all said boss means are simultaneously shaped in all fuel rod receiving cells.

5. Process according to claim 2 wherein said grid is located in a rigid frame and wedges are temporarily located in a rigid frame and wedges are temporarily located in the cells provided to receive guide tubes before said gauges are forced into said cells.

6. Method of manufacturing a gird for a nuclear fuel assembly, the grid having at lest two crossed sets of mutually parallel plates of zirconium-base alloy, fixed together by welding at the crossings, which define cells of which some receive guide tubes and others receive cylindrical fuel rods having a diameter which may vary, from one fuel rod to another, from a predetermined minimum value to a predetermined maximum value, due to manufacturing tolerances, the plates being provided with boss means for limiting the amount of movement available to the rods relative to the nodes of a regular array, said method comprising the steps of:
  (a) forming boss means projecting radially inwardly into each of said cells which are to receive fuel rods, by such an amount that said boss means define passages having sizes no greater than said predetermined minimum diameter, said boss means being formed as cut-out strips; and
  (b) shaping said boss means by deforming them radially outwardly, for imparting to each passage a predetermined radial size slightly higher than said predetermined diameter, by inserting radially expandable hollow gauges through said cells in a direction parallel to all said plates and expanding each of said gauges to said predetermined size with a stem introduced into said gauge in a direction parallel to all said plates.

7. Process according to claim 6, wherein each of said gauges is devided by slots into a plurality of fingers which are circumferentially evenly distributed.

8. Process according to claim 7, for manufacturing a grid having boss means comprising bosses located at a plurality of distances from a major surface of said grid, wherein the length of the slots and of an axial bore of said gauge is sufficient for the gauge to be cylindrical in a portion confronting all said bosses after the stem has been inserted.

9. Process according to claim 6, wherein said grid is placed in a rigid frame and cylindrical wedges are located in the cells for receiving guiding tubes before said stems are introduced in said gauges.

10. Process for assembling a solid grid and a bundle of cylindrical fuel rods of a nuclear fuel assembly, said grid having at least two crossed sets of mutually parallel plates which define cells, some of said cells receiving guide tubes and other of said cells receiving said fuel rods, the plates being provided with boss means for limiting the amount of movement available to the fuel rods relative to the nodes of a regular array and said fuel rods having a diameter which may vary, from one fuel rod to another, from a predetermined minimum value to a predetermined maximum value, said process comprising the steps of:
  (a) forming boss means on said plates which project radially inwardly into each of said cells for receiving fuel rods by such an amount that they define passages having sized no greater than said predetermined minimum diameter;
  (b) shaping said boss means by mechanical or electrical machining for imparting to each passage which is to receive a fuel rod a predetermined radial size slightly higher than said predetermined maximum diameter; and
  (c) inserting said fuel rods into the respective cells.

* * * * *